United States Patent [19]
Kettle, Jr.

[11] Patent Number: 5,984,427
[45] Date of Patent: Nov. 16, 1999

[54] METHOD AND APPARATUS FOR CONTROLLING ELECTRO-PNEUMATIC BRAKES ON TRAINS USING AN EXISTING LOCOMOTIVE ELECTRONIC AIR BRAKE

[75] Inventor: Paul J. Kettle, Jr., Ijamsville, Md.

[73] Assignee: Westinghouse Air Brake Company, Wilmerding, Pa.

[21] Appl. No.: 08/958,493

[22] Filed: Oct. 27, 1997

[51] Int. Cl.$^6$ ........................................ B60T 7/12
[52] U.S. Cl. ................................. 303/16; 303/20
[58] Field of Search ..................... 303/15, 16, 20, 303/28, 122.08, 122.05, 47, 128

[56] References Cited

U.S. PATENT DOCUMENTS

| | | | |
|---|---|---|---|
| 5,415,465 | 5/1995 | Skantar et al. | 303/3 |
| 5,460,435 | 10/1995 | Chew | 303/47 |
| 5,721,683 | 2/1998 | Joyce, Jr. et al. | 303/28 |
| 5,722,736 | 3/1998 | Cook | 303/15 |

*Primary Examiner*—Robert J. Oberleitner
*Assistant Examiner*—Mariano Sy
*Attorney, Agent, or Firm*—James Ray & Associates

[57] ABSTRACT

A method and apparatus for controlling an electro-pneumatic braking system on a railroad train having electronic brake control equipment including an operator display facility and brake handles located in a cab of a locomotive of the train. The method comprises interfacing an electrical brake control system with a locomotive interface unit and a cab control computer using an electro-pneumatic interface module. The locomotive interface unit is used to interface the electro-pneumatic interface module with a brake control computer associated with a pneumatic brake operating unit. The brake operating unit is connected in fluid communication with a brake pipe of a locomotive and train of railway cars connected to the locomotive. The method includes further the use of the electro-pneumatic interface module and the electronic brake control equipment to operate the brakes of the locomotive and train of cars in a manner that employs the advantageous features of electro-pneumatic braking while providing the operator/engineer with a familiar display screen of the operator display facility.

4 Claims, 1 Drawing Sheet

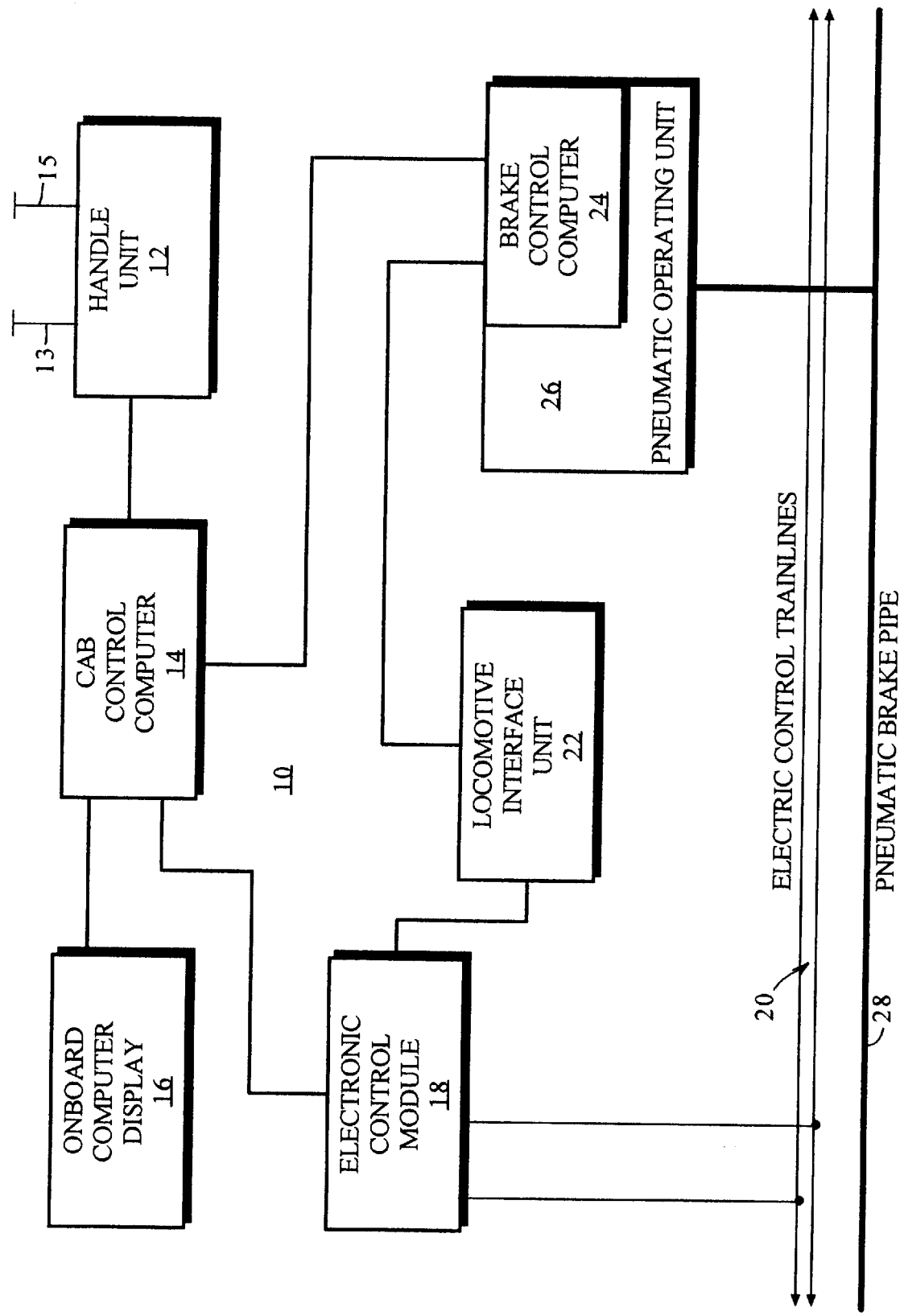

METHOD AND APPARATUS FOR CONTROLLING ELECTRO-PNEUMATIC BRAKES ON TRAINS USING AN EXISTING LOCOMOTIVE ELECTRONIC AIR BRAKE

FIELD OF INVENTION

The present invention relates generally to railway train brakes, and more particularly to a method of controlling electro-pneumatic braking (ECP) systems on trains using existing hardware associated with electronic airbrake controls, such as the EPIC® system developed by Westinghouse Air Brake Company. Such a method combines the operation of electro-pneumatic brakes with existing electronic and EPIC® technology to provide a means of control which is similar in appearance and operation to exiting pneumatic braking technology from the operator's standpoint, while incorporating advanced features of electro-pneumatic braking, as discussed in detail hereinafter. The invention also provides means for incorporating conventional, pneumatic control of braking systems in the event of a failure of the electro-pneumatic equipment, which failure is detected by the apparatus of the invention in which conventional control is automatically implemented.

BACKGROUND OF THE INVENTION

Existing electro-pneumatic braking equipment requires the use of an additional operator control facility to provide signals for the electronic controls of car brake systems. The signals are conveyed by radio signaling between a locomotive and cars of a train or conducted through trainline wires connected between the locomotive and cars and throughout the cars of the train. Such signals cause the electro-pneumatic brakes to assume conditions based upon the operator's use of such devices as push-buttons located in the cab of a locomotive. Existing brake handles in the cab are not used during application and release of the electro-pneumatic brakes. Further, the addition of a separate control device clutters an already crowded environment in the locomotive cab. The operator is therefore required to be trained on two methods of controlling the braking system on the train, namely, the push button controls and the well known brake handles. Further, brake status display is in two places, namely on the ECP control device and on the operator's normal display screen. This divides the attention of the operator.

SUMMARY OF THE INVENTION

The method and apparatus of the invention uses the existing automatic brake handle of EPIC® and other electronic systems to control operation of electro-pneumatic brakes thereby emulating present day use of the automatic brake handle. As such, the brake pipe that extends from the locomotive to and throughout the cars is used for both brake control and charging of the train brake system in the conventional, pneumatic mode, and only for charging in the electro-pneumatic (ECP) mode. This requires the addition of two supplemental control modes, namely LEAD ECP and TRAIL ECP, along with the addition of an electronic ECP interface module. This module communicates with an EPIC® computer and provides actual control of electro-pneumatic trainline wires or radio signals. The LEAD and TRAIL ECP modes condition the EPIC® computer to interface with the ECP interface unit in ways explained in detail hereafter.

OBJECTS OF THE INVENTION

It is, therefore, an object of the present invention to combine the operation of electro-pneumatic train brakes with the EPIC® technology so as to provide a means of control that is similar in appearance to existing pneumatic braking technology from the standpoint of the operator/engineer and in which the combined operation incorporates advanced features of the electro-pneumatic system.

It is another object of the present invention to interface electro-pneumatic and EPIC® systems in a two way manner, using an interface module, such that commands can be sent to the interface by the EPIC® system and the interface can send status reports of the electro pneumatic system to the EPIC® system wherein such reports provide basis for implementation of pneumatic braking in the event of a malfunction in the electro-pneumatic system.

Another object of the present invention is to eliminate the operator control system of the electro-pneumatic braking equipment such that the attention of the operator/engineer is not divided. Instead, the current separate ECP display is now integrated with the existing operator's display screen, with the EPIC® system providing messages to be displayed thereon. This allows the operator to focus his attention on the area that is the normal location for brake information, all of which is now a function of the EPIC® locomotive brake equipment.

THE DRAWING

The objectives and advantages of the invention will be better understood from consideration of the following detailed description and the accompanying drawing, the sole FIGURE of which is a schematic representation of the control system of the invention.

PREFERRED EMBODIMENT

Referring now to the drawing figure, a brake control arrangement is shown somewhat diagrammatically and is labeled by reference numeral 10. The arrangement uses the existing hardware of the EPIC® electro-pneumatic braking equipment, which hardware includes a brake handle unit 12 electrically connected to a cab control computer (CCC) 14. The brake handle unit includes the well known "automatic" handle 13 and independent handle 15.

Cab control computer 14 is electrically connected to an on-board host computer and display screen (OBC) 16 and to an electronic ECP module 18 that interfaces an electric brake control system, which in the drawing figure is shown as a trainline 20, with the cab control computer and with a locomotive interface unit (LIU) 22. A trainline comprises a plurality of electrical conductors that operate locomotive and car brakes under the auspices of cab control computer 14 and a brake control computer 24 using appropriate software.

Radio signals can also be used to operate the brakes, using a radio transceiver located on the locomotive and radio transceivers located on the respective cars of the train.

LIU Unit 22 interfaces the ECP interface module 18 with brake control computer 24. ECP module 18 has basic data handling circuitry that receives braking information from trainline 20 and passes the same to computer 14. Computer 14, as explained hereinafter, functions through the module 18, to control train brakes based upon the position of brake handles 13 and 15.

Similarly, LIU module 22 is a basic data handling device that transfers braking information between ECP module 18 and brake control computer 24 and a pneumatic brake operating unit (POU) 26, again, as explained below.

Computer 24 is shown located on pneumatic brake-operating unit (POU) 26. The pneumatic operating unit 26 is, of course, connected in fluid communication with a brake pipe 28 that extends from the locomotive to and throughout the cars of a train connected to the locomotive.

Pneumatic operating unit 26 is a laminated panel provided with internal passages that connect fluid pressures in brake pipe 28 to control devices including magnet valves (not shown) which control all pressures operating under the auspices for EPIC® system. These pressures include the pressure in (1) brake pipe 28, (2) in brake cylinders (not shown), (3) in an equalizing reservoir (not shown), (4) in a brake actuating pipe (not shown) and (5) in an independent application and release pipe (not shown) of the locomotive.

The on-board computer and display 16 are generally provided by the manufacturer of the locomotive. On locomotives having no such computer and display, the EPIC® system provides a stand-alone display unit (not shown) which operates under control of the EPIC® cab control computer 14.

In addition, POU 26 has a back-up portion (not shown) that provides brake cylinder pressure in the event of an electrical power failure and subsequent reduction in brake pipe pressure.

The use of electro-pneumatic brake equipment, including the laminated panel of POU 26, provides numerous advantages over systems for braking locomotives and railway cars that are all pneumatic. The internal passages of the laminated panel, for example, provide for fewer pipe connections, far fewer overall components, and more precise control over operating fluid pressures. In addition, electro-pneumatic brake systems use modular components mounted on the panel that provide easier and faster repair. Further, electro-pneumatic systems provide interfacing with locomotive systems that are defined by their software and intelligent interfacing with other systems. There is also the elimination of air noise from the operator's compartment and environment, flexible configuring based on software changes, and internal diagnostics and fault logging.

The present invention uses these advantageous features in combination with the EPIC® and similar electronic brake systems in a way that is similar in appearance and operation to the old pneumatic braking technology in so far as the operator/engineer is concerned.

In the conventional pneumatic mode of operating train brakes, brake pipe 28 is used to control train brakes as well as charging the brake system, while in the electro-pneumatic system brake pipe 28 only charges the system, i.e., the brakes are operated electrically under the electro-pneumatic system using signals sent along wires of trainline 20. In the present invention, interface module 18 is employed to communicate with the EPIC® system and provide actual control of trainline wires 20 using two supplemental modes of control in the EPIC® system, namely, a LEAD ECP mode and a TRAIL ECP mode. These modes configure the software of EPIC® computer 14 to interface with the ECP module 18 in the following manner.

In the LEAD ECP mode, cab control computer 14 does not respond to the movement of the automatic brake handle 13 in the normal fashion and no reduction of pressure in brake pipe 28 takes place. Thus, full equalizing reservoir and brake pipe pressure is maintained during normal operation of the cars and locomotive. Movement of the automatic handle between release and full service positions, however, does result in development of a zero to 100 percent signal representing brake cylinder pressure, which signal is sent to ECP module 18. This signal is based on the full equalization pressure for the existing set-up pressure in the equalizing pressure reservoir as set by the operator of the locomotive and sensed by a transducer located to receive reservoir pressure. The ECP system orders brake application electrically based on handle position. Hence, the LEAD ECP mode provides graduated brake application and release, via trainline 20, and a minimum brake cylinder pressure development can be set at a normal value of say ten psig. This pressure is set in the software of computer 14 in response to brake handle position. The development of brake cylinder pressure on the locomotive can be in the same proportion as that developed for the brakes of the railway cars as part of the configuring of cab control computer 14. The software of the computer can provide the additional option of allowing the operator to use the bail-off feature available with an independent brake valve handle (handle 15 in the drawing figure), with computer 14 operating through the brake control computer 24 and POU 26. (Bail off involves the use of locomotive brakes to control slack between the cars of a train and between the locomotive and the cars). Further, the software of computer 14 can tie the bail off of locomotive brakes with dynamic braking in which the diesel-electric power system of the locomotive is employed to dissipate electrical power to mechanically slow the train.

The software of the EPIC® system depicted in the drawing provides two way communications between the EPIC® system and the electro-pneumatic interface module 18. This includes the brake commands sent to the module by computer 14, and the module, in turn, can provide brake status reports to computer 14, and hence to display 16. Module 18 receives signals from trainline 20 that indicate brake status. These reports can be the basis for implementing pneumatic braking via the locomotive interface unit 22, POU 26, and the brake control computer 24 in the event of a malfunction in the electro-pneumatic system which uses trainline 20 to order brake application electrically.

Upon receipt of a penalty signal, such as a cab signal or an alertor penalty, computer 14 can be programmed for a proper response. For example, if the electro-pneumatic system is functioning and brake application is in effect, alertor penalty results in an increase in the level of the electro-pneumatic brake application, which occurs in disregard of the position of the automatic handle 13, and removal of locomotive power for safety reasons. (An alertor is a device in the locomotive cab that senses inactivity of the engineer, as would be the case if the engineer fell asleep or suffered a disability that rendered him motionless; it then orders removal of locomotive power).

If the electro-pneumatic system detects a fault in its system, module 18 sends a penalty signal to the locomotive interface unit 22 and cab control computer 14. Unit 22 informs the brake control computer 24 of the fault. Computer 24 can be programmed to order one or more of a series of actions, such as (1) retain the present level of electro-pneumatic brake application via trainline 20, (2) reduce pressure in brake pipe 28 to zero at a service rate, and (3) remove power to the locomotive diesel-electric motor system. Computer 14 can also be programmed to provide a similar response in event of a loss of communications with the interface module 18.

As seen in the drawing figure, there is no separate electro-pneumatic display. Rather, the electro-pneumatic system uses display screen 16 of the on-board computer or of an EPIC® computer, with the EPIC® components providing messages to be displayed thereon. This allows the operator to focus his attention on screen 16 which is the normal location for brake information, which is now a function of the EPIC® brake system.

In addition, the operator has no electro-pneumatic buttons to be concerned with; brake handles 13 and 15 are now the objects for manual operation of brakes, which is the normal situation for operators.

The second of the above two supplemental modes for braking, as provided by the invention, as thus for described, is the TRAIL ECP mode. For this mode the cab control computer 14 is programmed in a manner similar to that of the well known LEAD CUT-OUT configuration except that brake pipe 28 is not used for initiation of brake cylinder pressure. Instead, computer 14 responds to signals on trainline 20 as presented by interface module 18. In the event of a reduction of pressure in brake pipe 28 while trainline 20 is the being used to apply brakes, with brake pipe reduction being forwarded to computer 14 through POU 26 and brake control computer 24, computer 14 is programmed to respond to the greater of the two signals (from the trainline and brake pipe).

The program of computer 14 still allows operator bail off of locomotive brakes using independent brake valve handle 15.

While a presently preferred embodiment for carrying out the instant invention has been set forth in detail in accordance with the Patent Act, those persons skilled in the braking art to which this invention pertain will recognize various alternative ways of practicing the invention without departing from the spirit and scope of the claims appended hereto.

What is claimed is:

1. A method of controlling an electro-pneumatic braking system on a railroad train having electronic brake control equipment including an operator display facility and brake handles located in a cab of a locomotive of the train, the method comprising:

interfacing an electrical brake control signaling system with a locomotive interface unit and a cab control computer using an electro-pneumatic interface module, using the locomotive interface unit to interface said module with a brake control computer associated with a pneumatic brake operating unit, said brake operating unit being connected in fluid communication with a brake pipe of a locomotive and train of railway cars connected to the locomotive, using said electro-pneumatic interface module and electronic brake control equipment to operate the brakes of the locomotive and train of cars in a manner that uses electro-pneumatic braking features while providing the operator/engineer with a familiar display screen of the operator display facility, and using the electro-pneumatic interface module to receive brake commands from the locomotive interface unit and cab control computer, and to provide brake status reports to the cab control computer and to the operator display facility.

2. The method of claim 1 including, providing the cab control computer with LEAD and TRAIL supplement brake control modes for an electro-pneumatic braking system that condition said computer to interface with the interface module and thereby provide said LEAD and TRAIL supplemental control modes.

3. The method of claim 2 including:

using the LEAD supplemental mode to provide (1) full equalizing reservoir set-up pressure during normal operation of the locomotive and train, (2) zero to 100 percent development of a signal representing brake cylinder pressure for the electro-pneumatic braking system, (3) an operator option for bail off of locomotive brakes, (4) two way communication between the electro-pneumatic braking system and the electronic brake control equipment, and (5) penalty brake control responses.

4. Apparatus for controlling an electro-pneumatic braking system on a railroad train having electronic brake control equipment that includes an operator display facility and brake handles located in a cab of a locomotive of the train, the apparatus comprising:

an electro-pneumatic interface module interfacing an electrical brake control system with a locomotive interface unit and a cab control computer, a brake control computer associated with a pneumatic brake operating unit, with the locomotive interface unit interfacing said electro-pneumatic interface module with the brake control computer, means connecting the pneumatic brake operating unit with a brake pipe of the locomotive and train of railway cars coupled to the locomotive, said electro-pneumatic interface module and electronic brake control equipment being effective to operate the brakes of the locomotive and train of cars in a manner that uses advantageous electro-pneumatic braking features while providing the operator/engineer with a familiar display screen at the operator display facility and brake status reports supplied to the cab control computer and to the operator display facility.

* * * * *

UNITED STATES PATENT AND TRADEMARK OFFICE
CERTIFICATE OF CORRECTION

PATENT NO. : 5,984,427  
DATED : 11-16-99  
INVENTOR(S) : Paul J. Kettle, Jr.

Page 1 of 2

It is certified that error appears in the above-identified patent and that said Letters Patent is hereby corrected as shown below:

Column 1, line 6, please insert -- THE -- after the word "OF";
Column 1, line 10, please delete "airbrake" and insert --air brake --;
Column 1, line15, please delete the word "exiting" and insert -- existing --;
Column 1, line 43, please insert a --, -- after the word "namely";
Column 2, line 10, please delete the words "electro pneumatic" and insert the word -- electro-pneumatic --;
Column 2, line 40, please delete the " around the word automatic;
Column 2, line 54, please delete the word "Unit" and insert the word -- unit --;
Column 2, line 59, please delete the "," after the 18;
Column 2, line 61, please delete the word "module" and insert the word -- unit --;
Column 2, line 65, please delete the word "brake-" and insert the word -- brake --;
Column 3, line 28, please delete "," after the word components;
Column 3, line 37, please delete "," after the word changes;
Column 4, line 32, please delete the "," after 26;
Column 4, line 55, please delete the "," after the word "rate";
Column 5, line 6, please delete the word "for" and insert the word -- far --;
Column 5, line 14, please delete the word "the";
Column 5, line 25, please delete the word "pertain" and insert the word -- pertains --;
Column 5, line 45, please delete the word "the";
Column 5, line 47, please delete the word "the" and insert the word -- an --;

UNITED STATES PATENT AND TRADEMARK OFFICE
CERTIFICATE OF CORRECTION

PATENT NO. : 5,984,427
DATED : 11-16-99
INVENTOR(S) : Paul J. Kettle, Jr.

It is certified that error appears in the above-identified patent and that said Letters Patent is hereby corrected as shown below:

Column 6, line 8, please delete the word "supplement" and insert the word -- supplemental -- ;
Column 6, line 8, please delete the word "an" and insert the word -- said --;
Column 6, line 9, please insert the word -- cab control -- after the word "said";
Column 6, line 13, please delete " : " and insert -- , --;
Column 6, line 22, please delete " , ";
Column 6, line 40, please delete the word "the";
Column 6, line 43, please delete the word "the" and insert the word -- an --.

Signed and Sealed this

Seventeenth Day of April, 2001

Attest:

NICHOLAS P. GODICI

Attesting Officer        Acting Director of the United States Patent and Trademark Office